(12) United States Patent
Massoudi (10) Patent No.: US 7,584,454 B1
(45) Date of Patent: *Sep. 1, 2009

(54) SEMANTIC-BASED TRANSACTIONAL SUPPORT AND RECOVERY FOR NESTED COMPOSITE SOFTWARE SERVICES

(75) Inventor: Arash Massoudi, Dublin, CA (US)

(73) Assignee: NextAxiom Technology, Inc., San Francisco, CA (US)

( * ) Notice: Subject to any disclaimer, the term of this patent is extended or adjusted under 35 U.S.C. 154(b) by 960 days.

This patent is subject to a terminal disclaimer.

(21) Appl. No.: 10/711,322

(22) Filed: Sep. 10, 2004

Related U.S. Application Data (60) Provisional application No. 60/481,348, filed on Sep. 10, 2003.

(51) Int. Cl.
G06F 9/44 (2006.01)
G06F 12/00 (2006.01)
(52) U.S. Cl. .................. 717/121; 717/120; 707/202
(58) Field of Classification Search ............. 717/100, 717/120–135; 707/200–204; 714/37, 38, 714/47; 719/320
See application file for complete search history.

(56) References Cited

U.S. PATENT DOCUMENTS

| | | | |
|---|---|---|---|
| 5,758,062 A | 5/1998 | McMahon et al. | |
| 5,768,588 A | 6/1998 | Endicott et al. | |
| 5,774,583 A | 6/1998 | Sasaki et al. | |
| 5,805,785 A * | 9/1998 | Dias et al. ..................... | 714/4 |
| 6,115,040 A | 9/2000 | Bladow | |
| 6,253,366 B1 | 6/2001 | Mutschler, III | |
| 6,434,598 B1 | 8/2002 | Gish | |
| 6,457,064 B1 | 9/2002 | Huff et al. | |
| 6,563,441 B1 | 5/2003 | Gold | |
| 6,665,677 B1 | 12/2003 | Wotring et al. | |
| 6,684,222 B1 | 1/2004 | Cornelius et al. | |
| 6,691,302 B1 | 2/2004 | Skrzynski et al. | |
| 6,697,363 B1 | 2/2004 | Carr | |
| 6,775,822 B1 | 8/2004 | Apte et al. | |
| 6,804,773 B1 | 10/2004 | Grigsby et al. | |
| 6,832,219 B2 | 12/2004 | Lal | |
| 6,917,620 B1 | 7/2005 | Sindhu et al. | |
| 6,925,631 B2 | 8/2005 | Golden | |
| 6,934,712 B2 | 8/2005 | Kiernan et al. | |
| 6,985,939 B2 | 1/2006 | Fletcher et al. | |
| 6,996,589 B1 | 2/2006 | Jayaram et al. | |
| 7,035,944 B2 | 4/2006 | Fletcher et al. | |
| 7,047,243 B2 * | 5/2006 | Cabrera et al. ................ | 707/10 |
| 7,111,197 B2 * | 9/2006 | Kingsbury et al. ........... | 714/19 |
| 7,159,185 B1 | 1/2007 | Vedula et al. | |
| 7,171,672 B2 | 1/2007 | Just | |
| 7,178,050 B2 * | 2/2007 | Fung et al. .................... | 714/4 |

(Continued)

OTHER PUBLICATIONS

Yang et al., "Realizing Fault Resilience in Web-Server Cluster," Nov. 2000, IEEE, p. 1-15.*

(Continued)

*Primary Examiner*—Wei Y Zhen
*Assistant Examiner*—Qing Chen
(74) *Attorney, Agent, or Firm*—Workman Nydegger

(57) ABSTRACT

Methods, systems, frameworks and software products are disclosed for semantic-based definition of optionally nested transactional behavior, with an extensible automated, built-in ability to recover, commit, rollback or compensate while invoking nested composite software services containing other software services such as, but not limited to Web services.

9 Claims, 4 Drawing Sheets

U.S. PATENT DOCUMENTS

| | | | |
|---|---|---|---|
| 7,188,155 B2 * | 3/2007 | Flurry et al. | 709/219 |
| 7,194,485 B2 | 3/2007 | Kaipa et al. | |
| 2001/0052108 A1 | 12/2001 | Bowman-Amuah | |
| 2002/0052939 A1 * | 5/2002 | Lee | 709/223 |
| 2002/0169889 A1 * | 11/2002 | Yang et al. | 709/244 |
| 2002/0194244 A1 * | 12/2002 | Raventos | 709/101 |
| 2003/0014500 A1 * | 1/2003 | Schleiss et al. | 709/218 |
| 2003/0120782 A1 | 6/2003 | Bortoloso et al. | |
| 2003/0177150 A1 * | 9/2003 | Fung et al. | 707/204 |
| 2003/0217033 A1 | 11/2003 | Sandler et al. | |
| 2003/0233602 A1 * | 12/2003 | Lindquist et al. | 714/47 |
| 2004/0003029 A1 | 1/2004 | Islam et al. | |
| 2004/0015564 A1 * | 1/2004 | Williams | 709/219 |
| 2004/0015578 A1 * | 1/2004 | Karakashian et al. | 709/223 |
| 2004/0064503 A1 * | 4/2004 | Karakashian et al. | 709/203 |
| 2004/0139151 A1 * | 7/2004 | Flurry et al. | 709/203 |
| 2004/0177335 A1 | 9/2004 | Beisiegal et al. | |
| 2004/0183838 A1 | 9/2004 | Lahiri et al. | |
| 2004/0239674 A1 | 12/2004 | Ewald et al. | |
| 2004/0243915 A1 * | 12/2004 | Doyle et al. | 714/796 |
| 2005/0015491 A1 * | 1/2005 | Koeppel | 709/226 |
| 2005/0015643 A1 * | 1/2005 | Davis et al. | 714/4 |
| 2005/0044197 A1 | 2/2005 | Lai | |
| 2005/0050526 A1 | 3/2005 | Dahne-Steuber et al. | |
| 2005/0182779 A1 | 8/2005 | Perry et al. | |

OTHER PUBLICATIONS

Lei et al., "The Design and Applications of a Context Service," Oct. 2002, ACM, p. 45-55.*

Zeng et al., "Quality Driven Web Services Composition," May 2003, ACM, p. 411-421.*

David C. Fallside, XlM Schema Part 0: Primer, W3C Recommendations, May 2, 2001 Published by W3C, 2001, p. 1-74.

Paul V. Biron, XLM Schema Part 2: Datatypes, W3C Recommendations, May 2, 2001 Published by W3C, 2001, p. 1-146.

Ahumada, et al. Specifying Fractal and GCM Conponents with UML, Chilean Society of Computer Science, 2008, SCCC 07, XX, Nov. 8-9, 2007, pp. 53-63.

Sun Microsystems, Web Service Made Easier—The Java APIs and Architectures for XML, A Technical Paper White Paper, Published by Sun Microsystems, Inc. Jun. 2002 Revision 3, pp. 1- 33.

Service Oriented Programming, from Wikipedia, the free encyclopedia. [online] 8 pages, retrieved from the Internet Jan. 22, 2009 http://en.wikipedia.org/wiki/Service_Oriented_Programming.

* cited by examiner

SEMANTIC-BASED TRANSACTIONAL SUPPORT AND RECOVERY FOR NESTED COMPOSITE SOFTWARE SERVICES

CROSS-REFERENCE TO RELATED APPLICATION

This application claims the benefit of U.S. Provisional Application Ser. No. 60/481,348, filed on Sep. 10, 2003, entitled "Semantic-based transactional support and recovery for nested composite software services", which is incorporated herein by reference.

BACKGROUND OF THE INVENTION

1. Field of the Invention

The present invention relates to the field of software development and, in particular, to service-oriented programming and transactional support for nested composite software services.

2. Description of the Related Art

The reliable and correct execution of composite Web services is a key concern in the implementation of the emerging service-oriented systems. Addressing the reliability and correctness of nested composite Web services at runtime requires the addition of fault tolerance and transactional support to service-oriented platforms. Unfortunately, none of the known transaction processing technologies provides a model suitable and sufficient for the emerging service-oriented paradigm. This is mainly due to the diverse transactional behavior of heterogeneous and distributed Web service implementations.

The four main categories of existing transaction processing technologies address specific and limited semantic spaces:

Database transactions: This model involves transaction-processing technologies under full control of Data Base Management Systems (DBMS). These technologies assume a homogenous semantic space and dataset definition, based on relational database concepts, and thus are too rigid in definition. Furthermore, the transaction manager is non-extensible and closed to other transaction processing models.

Distributed Object transactions such as CORBA's Object Transaction Service (OTS) and X/Open DTP. Here, objects are only characterized by their interface and the transaction manager does not address the persistence of state. This means that the participating object (or the resource manager) must guarantee recoverability and durability by itself. Once the object provides the required interfaces and follows the specified Two-Phase-Commit (2PC) protocol, it can be used as part of transactions. While this provides a perfect heterogeneous model for automating atomic Web services used within the definition of composite Web services, it is demonstrably insufficient in addressing the transactional support of composite Web services for two main reasons: 1) The service-oriented platform that supports the implementation of composite Web services and provides transaction management capabilities must directly address the persistence and recovery of composite Web services. This is outside the semantic space for OTS and DTP. 2) The semantic space implied by these models strictly requires commit/rollback confirmation. This does not provide any flexibility in defining transactional composite Web services that may need to contain one or more Web services with optional, compensating, or alternative transactional behaviors (refer to the next section for an explanation of these behaviors).

Component container-managed transactions (such as Sun's EJB): This model mainly follows the distributed object model above and thus suffers from the same limitations with respect to the semantic needs of composite Web services. A point worthy of mention is that this model, unlike the distributed object transaction model, uses declarative transaction management. This effectively simplifies the coding of transactions since it only requires setting transactional attributes to adjust a component's behavioral operations. This technique is inspiring in that it separates transaction behavior from business logic, thus allowing reusability. However, it is limited in that it does not provide a way for the external client to override these internal attributes.

Message-oriented transactions and transactional publish/subscribe: These transactions group a set of messages, a unit of work, with strict "all-or-nothing" semantics without addressing data processing and the consistency of data transmissions. This transaction model, like the others mentioned, does not provide semantics that address nested, heterogeneous transactions.

Undoubtedly, the definition of a new semantic space is required for adding reliability and correctness to nested composite Web services. Intuitively speaking, the new semantic space must blend ideas from various existing models to provide the flexibility required for accommodating behavioral diversity demanded by composite systems. The present invention is at the forefront of defining this new semantic space for composite systems.

As the first step in adding reliability to composite Web services we define the semantics of the Web service dataset, herein below referred to as a service-set, that needs to be persistent for the purpose of state recovery after any failure. A service-set is composed of four distinct, and possibly empty, data-elements: 1) the inputs, 2) the properties (such as the URL of the service), 3) the outputs, and 4) the composite-set, where the composite-set is either the empty dataset (in the case of atomic Web services), or a set containing one or more service-sets. Note that the recursive definition of the nested-set element allows us to later accommodate recovery of nested composite Web services to any depth.

The recovery of a composite Web service will, at times, require re-execution of embedded services that were successfully executed before the crash. For example, consider a time-sensitive Web service such as GetStockQuote that takes a ticker symbol as input and returns the current value of the stock associated with that ticker as output. Imagine that GetStockQuote is embedded within a composite service that crashes sometime after the execution of the GetStockQuote service. Here, upon recovery, instead of simply restoring the output element of the persistent service-set associated with GetStockQuote, the correct behavior may be to re-execute GetStockQuote to avoid stale and out-of-date data. As a contrary example, consider an IncrementCounterAndGetValue Web service that returns the value of a counter after incrementing it by one. Imagine that this service is embedded in a composite service that crashes sometime after the successful execution of IncrementCounterAndGetValue. Here, unlike in the GetStockQuote example, upon recovery of the parent composite service, IncrementCounterAndGetValue must not be re-executed. Instead, the output of the IncrementCounterAndGetValue instance that was executed prior to the crash must be restored from the output element of the associated service-set. These two contrary examples are intended to demonstrate that not only is the definition of a Web service dataset specific to a service-oriented paradigm, but also the behavior of recovery depends on the application of the service. To address diverse recovery behavior for services, we will introduce a declarative service-set definition where the behavior of recovery can be selected from a finite set of possibilities, decided at the application level, and set as a property on the service-set.

A semantic space for defining the transactional behavior of Web services requires the same type of flexibility as that required for their recovery. It is desirable to define transactional composite Web services without requiring that all embedded services, to any depth, must be transactional services. For example, one may want to define a transactional composite Web service that embeds the non-transactional GetStockQuote service. In other words, the semantic space for transactional Web services must allow for optional, or non-transactional, Web services to be embedded within transactional composite Web services.

Similarly, to accommodate the diverse transactional behavior of heterogeneous Web service implementations, this semantic space must allow for compensation of embedded Web services upon rollback of the parent Web service. For example, upon rollback of a parent composite Web service that embeds a SendEmail Web service, the designer of the parent service must be able to compensate for the already executed SendEmail. In this case, another SendEmail service may be executed to notify the recipient of the cancellation of the first service. Another behavior that must be accommodated in the new space is alternative Web service routing instead of rollback. For example, consider a child ShipThroughFedEx Web service that triggers a failure/rollback upon execution. Here, the designer of the parent service must be able to instruct the transactional system to route to an alternative ShipThroughDHL service instead of rolling back the other prepared services within the parent service.

A flexible semantic space for Web service transactions must also allow combining internal as well as external handling of transactional behavior for Web services. For example, it should be possible to embed a transactional Web service within a composite Web service and then override the rollback behavior of the embedded service to invoke an alternative service, rather than rolling back. For atomic Web services, semantics similar to container-manager, or distributed object transaction model can be leveraged to accommodate automated commit/rollback behavior internal to the atomic Web service.

3. General Background

A software service, or service for short, including but not limited to a Web service, is a discrete software task that has a well-defined interface and may be accessible over the local and/or public computer networks or maybe only available on a single machine. Web services can be published, discovered, described, and accessed using standard-based protocols such as UDDI, WSDL, and SOAP/HTTP.

Figure 1:
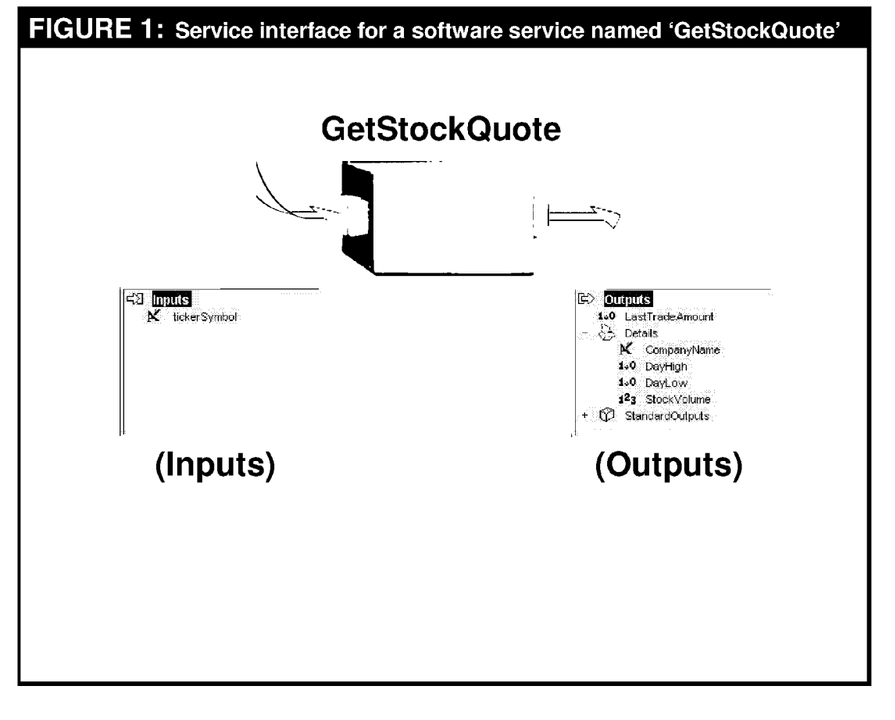
FIG. 1 depicts an example interface of a software service named 'GetStockQuote'.

A software service interface, in concept, represents the inputs and outputs of a black-boxed software service as well as the properties of that service, such as name and location. Take, for example, the interface of a simple software service named GetStockQuote, which retrieves simple stock quote information FIG. 1. This service takes a ticker symbol input and returns the last trade price amount as well as some additional stock quote details, such as the day high and day low. Note that in order to use, or consume, a service, only knowledge of its interface is required. This means that as long as the interface of a service remains the same, different implementations of the service can be swapped in and out without affecting its consumers. This, as well as the fact that a service is a language- and platform-neutral concept, is one of the keys to the flexibility of service-oriented architectures.

An atomic service is a software service that is implemented directly by a segment of software code. In the existing Nex-tAxiom™ HyperService™ Platform, atomic Web services are dispatched via a library. A library is a light, language- and platform-neutral wrapper that is linked to one or more atomic Web service implementations. Atomic Web services are logically indivisible Web services that represent "raw materials" to the HyperService™ platform.

A composite service is a software service that consumes any number of other atomic or composite services. In the HyperService™ platform, a composite Web service is implemented with a metadata-driven model that is automatically interpreted by a high-performance run-time engine.

Figure 2:
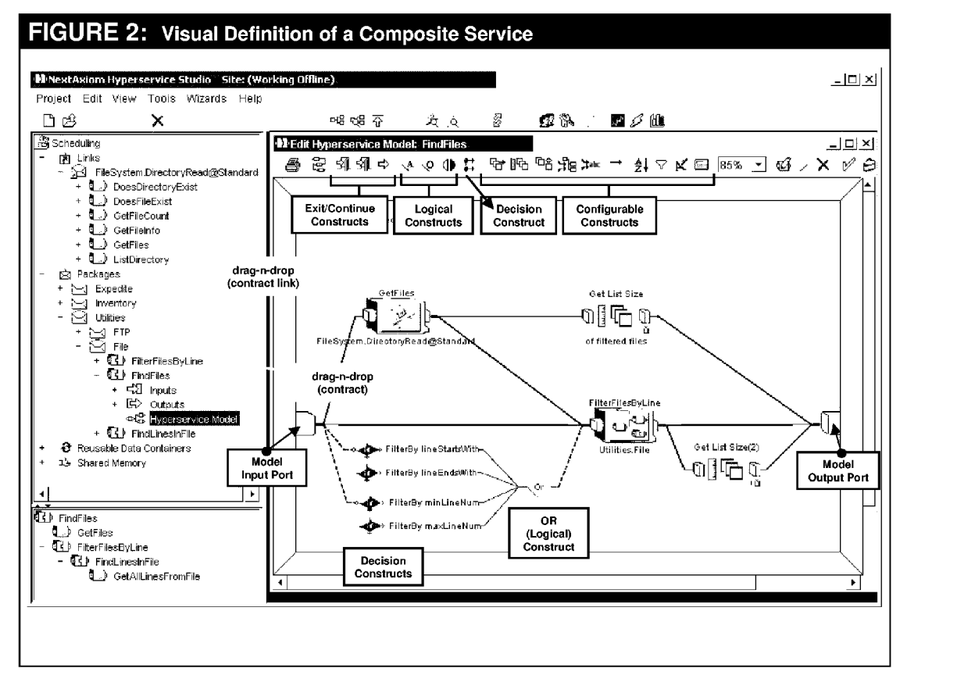
FIG. 2 shows visual composition of a software service using a service composition and assembly tool, HyperService™ Studio.

Visual metadata models, which represent composite software services implementations to the HyperService™ system, are created in a graphical, design-time environment and stored as XML models. This environment offers a new and powerful visual modeling paradigm that can be leveraged to enable the visual modeling of transactional behavior. This environment was specifically designed to enable collaborative, on-the-fly creation of software services by business process analysts or functional experts, who understand the business logic and application required to implement real-world business processes and applications, but have no knowledge of programming paradigms or Web service protocols. FIG. 2 captures the implementation of a composite software service named "FindFiles".

Figure 3:
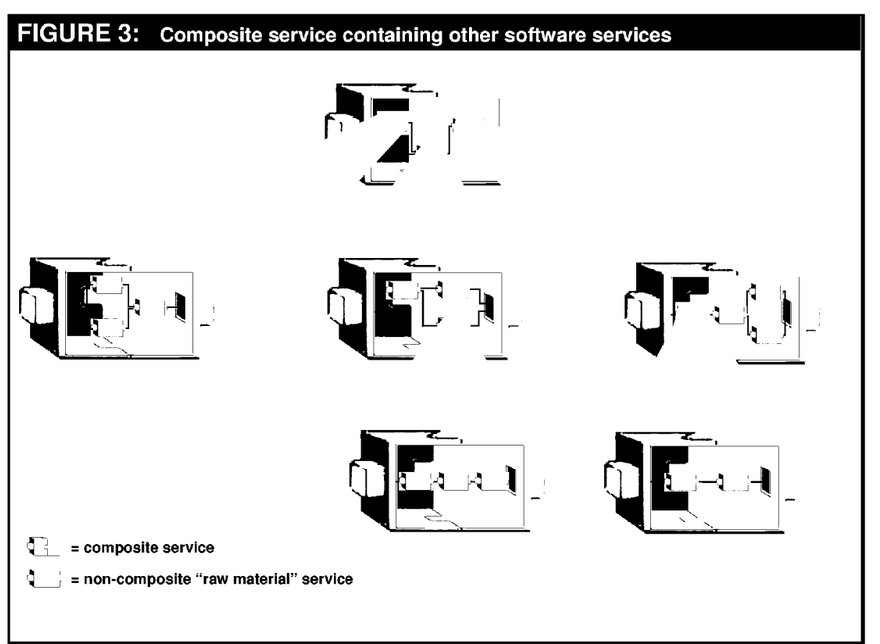
FIG. 3 shows the nesting of other software services within a composite software service.

Any software service that is consumed by a composite service model is said to be "nested" or "embedded" within that composite service. FIG. 3 depicts a hypothetical composite service. This software service is composed of other composite services that can run locally or distributed.

SUMMARY OF THE INVENTION

A principle object of the present invention is to provide a system and a method for defining and automating service recovery and transactional behavior, including commit/rollback and compensation, of a software service, including, but not limited to, "Web services", where the software service maybe a composite software service, one that is composed of other services nested without a fixed limit on the depth of composition.

The present invention provides a declarative system where a software service can be declared as transactional or non-transactional and the said declaration is associated to its interface definition or associated to the context of the composite service that it is contained in, where furthermore, the declaration within the context can override the declaration within the interface. The said declarative system provides for customizing the behavior of the services contained in a composite service upon automatic recovery.

Furthermore, the present invention provides the ability to declare a contained service as transactional whether or not the containing composite service is marked as transactional.

A further object of the present invention is to provide a framework for extending the automated transactional behavior of the system through a plug-in architecture for non-composite services. The present invention provides a set of generic built-in database access services (e.g. update, query, delete, and add), that are non-composite services in nature, with automated transactional behavior that can be used within composite services using a composition tool.

The present invention provides a semantic-based means for defining the transactional and recovery behavior of optionally nested, composite software services, with respect to the context of the containing service, using a service composition tool.

Yet another object of the present invention is to provide a persistent, nested context mechanism capable of remembering the exact state of execution corresponding to the invocation of nested composite services as it relates to transactional support. This context mechanism includes the shared memory used within a composite service as well as the context for non-composite services used within a composite service.

Other objects and advantages of this invention will be set in part in the description and in the drawings which follow and, in part, will be obvious from the description, or may be learned by practice of the invention. Accordingly, the drawings and description are to be regarded as illustrative in nature, and not as restrictive.

To achieve the forgoing objectives, and in accordance with the purpose of the invention as broadly described herein, the present invention provides methods, frameworks, and systems for defining and automating transactional behavior, including commit/rollback and compensation, of a software service. In preferred embodiments, this technique comprises: the association of commit/rollback and compensation ports to the graphical presentation of software service, contained within a composite service and manipulated through a composition tool; a plug-in framework for providing software wrappers around non-composite software service implementations to provide automatic transactional support behavior for the non-composite services contained within a composite service; a persistent context mechanism based on a directed execution graph and an invocation map associated to each composite instance; a system for automating the flow of execution based on user-defined semantic definitions and built-in behavior, as it relates to, commit, rollback and compensation of services within a composite service; a technique for communicating the context of each service, based on the definition of the services, including the commit, rollback and compensation by the module implementing the non-composite service as well as automated commit/rollback behavior for the shared memory used within the context of the nested composite services.

The present invention will now be described with reference to the following drawings, in which like reference numbers denote the same element throughout. It is intended that any other advantages and objects of the present invention that become apparent or obvious from the detailed description or illustrations contained herein are within the scope of the present invention.

DESCRIPTION OF THE PREFERRED EMBODIMENTS

The present invention provides a semantic space, as a visual interface, for defining transactional and recovery behavior within the implementation of composite software service, including, but not limited to Web services. This invention also provides a framework for a fault-tolerant, automated, nested, transactional system supporting the visual semantic space.

Assuming a visual software service composition and assembly tool, such as HyperService™ Studio with a snapshot of a definition in FIG. 2, and an automatic flow platform, such as the HyperService™ platform. We will now describe how such a composition tool and platform can be extended to accommodate declarative semantic-based recovery and transactional support for nested composite web services.

A context sensitive attribute is added to the properties of a service contained in a composite service declaring the behavior of the service node upon recovery in the event of system crash or other similar abnormal termination events. This attribute indicates whether to automatically re-invoke the service instance corresponding to the definition even if the persistent state of the execution of the containing composite service indicates that a corresponding service instance was already invoked successfully prior to the system crash.

To accommodate a declarative semantic-based behavior for nested composite services, a set of attributes and a visual flow port(s) are added to a composite service definition and the contained service nodes within a composite service definition. An attribute associated to a service interface definition, or the composite definition allows the application developer, or any user of the composition tool, to indicate whether a transactional context should be created for the composite instance associated to the composite definition upon execution. In other words, what is declared is, whether the composite definition is transactional. Similar attribute is associated to a service node contained within a composite definition to indicate whether the contained service, in the context of the containing service, is transactional. This allows the application developer to overwrite the respective behavior of a service that is declared on its interface or definition based on the context of its usage within another composite service.

Figure 4:
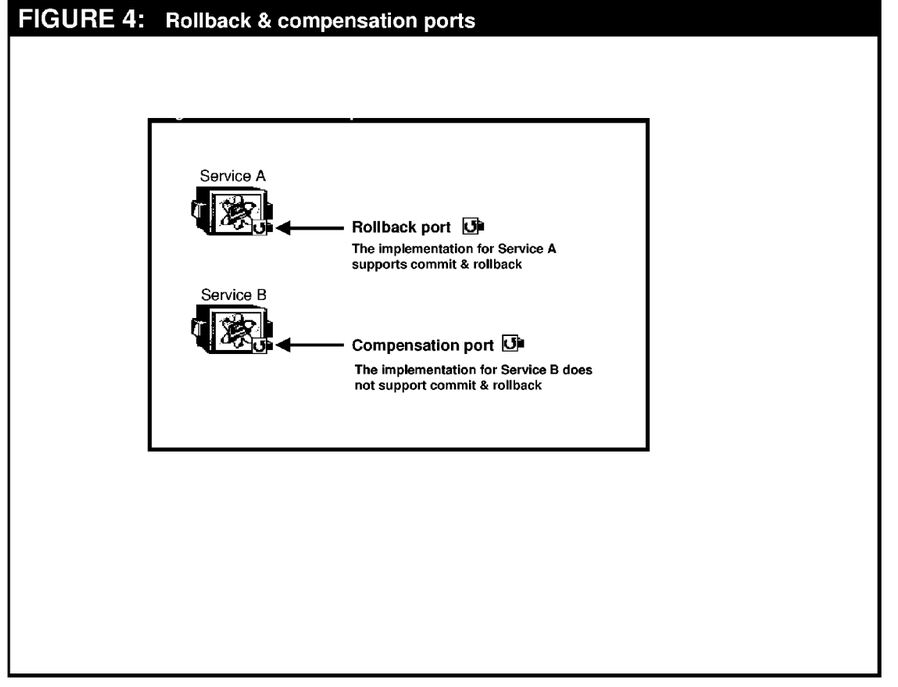
FIG. 4 shows an example of visual rollback and compensation ports on a software service defined within a composite implementation.

Next, one or more flow ports, refer to FIG. 4, are added to the visual presentation of each service node within a persistent composite service definition. Each port allows the application developer to determine the flow of service invocation when a rollback/compensation event is triggered; for example, as the result of the failure of one of the contained services.

The flow port allows the application developer to route the flow of invocation to another service or programming construct within the composite service definition. An attribute on the port, allows the application developer to declare whether the built-in commit/rollback/compensate behavior of the associated service should be extended through the connectivity of the rollback port, or should be overwritten.

Another behavior of the flow port, which appears on the visual presentation of non-composite contained services with libraries not supporting the commit/rollback/compensate interface later discussed as part of the present invention, allows the application developer to define a flow of invocation that can compensate for the overall failure of the containing composite service that triggered the activation of this port for the purpose of compensation.

To support the automatic implementation of transactional behavior for atomic Web services, a wrapper interface must be implemented for all service libraries wanting to provide transactional support at the atomic level. This transactional interface provides for the implementation of internal 2PC or automated compensation depending on the type of underlying system, delegated to the engineer of the library. One of the methods on the library interface for transactional support, allows the automating platform to request a unique context from the library. Upon the invocation of a transactional composite service, a unique context is acquired from each of the libraries associated with the services contained within that composite service. Another method on the wrapper interface, enables the automation platform to prepare a service associated to the implementing library within the unique context obtained from the library. Yet another method of the wrapper interface, enables the automation platform to commit or rollback a library context when needed.

As a non-exclusive example, a library implementation for a set of atomic database access services is provided by the automating platform. In this case, the unique context returned by the library, upon the request of the automating platform through the wrapper interface, is an object with a reference to a database connection. Every time the automating platform encounters a database access service associated to this library within the nested context of a composite service, regardless of the depth of nesting as long as one composite service within another is also marked as transactional, the automating platform calls the perform method with the associated unique context from the wrapper interface and as a result the database access library passes the corresponding SQL query through the connection to the backend database without performing a commit. When the automating platform decides that the invoked database access service must be committed, that is usually when the root transactional composite service is ready to exit with success, then the automating platform calls the commit method with the unique context as a parameter. However, if the automating platform decides that the database access services must be rolled back, due to the need to rollback the containing composite service, the automating platform calls the rollback method of the wrapper interface with the associated context as a parameter. In this way the database access library discards the connection associated to the context after rollback the database transactions associated to that connection.

In providing the automatic implementation of the declarative behavior, a persistent, nested context mechanism is devised. This context mechanism uses a set of service interfaces to provide persistence for the state of the service-sets corresponding to the invoked services, and the overall state of invocation of a composite service, containing other services, nested to any level of depth. The use of a set of service interfaces for persisting the complete state of the invocation increases the flexibility and customizability of the system by providing a layer of encapsulation that allows the automating system to use different storage medium such as direct file system vs. relational database.

To create a context for a composite service first a directed graph, hereon referred to as the execution graph, is created that captures the dependencies of all the contained service nodes, based on the connectivity of services from the existing success/failure and the added commit/rollback/compensation ports. Then, an object, hereon referred to as the Invocation Map is created, based on the execution graph, to hold the context of a composite service upon invocation. Additionally, modifications to shared data structures accessed within the definition of the corresponding composite service are stored in the Invocation Map as an object holding the context of the shared memory and providing commit/rollback methods for reflecting the changes, or discarding the changes done to shared memory within the context of a composite service instance.

Upon the invocation of a composite service, the automation platform, instantiates an Invocation Map, corresponding to the execution graph created based on the dependency of contained services. Then, it determines the set of services that can be invoked next by: 1) traversing the execution graph in the order of node dependencies with the nodes having no dependencies or dependencies to the input data of the composite service only, as the first set of nodes; and, 2) the nodes with dependencies to prior nodes and the inputs of the composite service, as the second set of nodes, and so on. After preparing the input data for those services, the automation platform stores the corresponding service-sets in the Invocation Map, while the Invocation Map ensures the persistence of the service-set and its state. Then, the automation platform invokes the prepared services, while a unique key is associated to the invocation of each service, for the purpose of recovery from an unknown state. Hereon, we will refer to the invocation of each set of prepared services as a HyperCycle. Also, the Invocation Map holds the unique context associated to each atomic library, keyed by the identifier of that library, as part of its overall context.

To provide the automatic runtime behavior for transactional support, under the declarative and semantic-based visual techniques discussed in the present invention, the automation platform starts the invocation of a composite service instance, declared as transactional, by creating a persistent instance of an Invocation Map based on the composite service definition. Then, once services within each HyperCycle are invoked, if all the services are consumed successfully (or, even if some services failed, by the had a defined routing upon failure that was successful) and if the containing composite service is a root service (i.e. one that is contained within another composite service), the nested contained composite services and all their nested composite services to the depth of nesting, within the containing composite service, are committed together with the entire unique context associated to each library, if any, and the context associated to the shared memory. If all the services contained within a composite service execute successfully (or, even if some services failed, by the had a defined routing upon failure that was successful), but the containing service is not a root containing service, the contained composite service will wait until it receives a commit or rollback call from the context of the containing service. Furthermore, if any of the services within a HyperCycle fail without a predefined routing upon failure, all the context within the Invocation Map of the composite service instance will be rolled back. This rollback will result in nested rollback, if any of the contained services are composite services, and it includes the rollback of shared memory and all the associated atomic libraries as discussed earlier. Once an invocation Map enters a rollback or a commit state, the connectivity of the rollback/compensation/commit ports of the contained services are implemented as follows: 1) If a flow port marked for rollback is connected, and if the port is declared as an overwriting port, the built-in rollback of the underlying service instance will not be requested by the automation platform; instead, the services connected to that port are invoked as the rollback act; 2) however, if the port is declared as an extending port, then after the completion of the rollback of the underlying service, the services connected to the port are invoked to extend the act of rollback. Upon rollback, if the compensation port of a service is connected to other services, those services are invoked by the automation platform. The act of rollback, is performed in a natural back tracking order with respect to all the contents of a composite service.

Incremental check-point recovery techniques, in conjunction with the persistent service-sets within the nested context mechanism and the declarative information associated to the definitions and interfaces, introduced as part of the present invention, can be used to automate the recovery of nested composite services. Basically, the persistent Invocation Map is used to store the status of the last service invoked within each HyperCycle. Upon a system failure that results in automatic recovery for the composite services declared as recoverable, The persistent Invocation Map associated to each instance of the composite service running at the time of the crash, is recovered. First, all the services that were successfully invoked prior to the crash are examined. Any of those service are declared as time-sensitive services that require re-invocation upon recovery are re-invoked and their service-sets are modified to reflect the new results of invocation. Than, the invocation continues from the last HyperCycle under invocation at the time of the crash. When the invocation status of a contained service is within the last HyperCycle is unknown, the automated recovery platform, re-invokes the service with the same unique id used upon invocation prior to the crash; if the service is an atomic service, guarantying the only once invocation of the service is delegated to the implementing library. If the unknown state is associated to a composite service, the automation platform, will recognize the service request as a prior request through its id, and initiates the recovery of the state of that service, if not yet recovered, and returns the resulting service-set including the output and the state of execution for that service.

What is claimed is:

1. In a computing system having one or more computers configured to invoke one or more composite software services, each composite software service containing one or more embedded software services, a method of creating a context for a composite software service, the method comprising:
   identifying a composite software service containing one or more embedded software services;
   receiving a request to invoke the composite software service;
   tracking in an execution graph connectivity and data dependencies among the one or more embedded software services contained within the composite software service including tracking any context-sensitive attributes for the one or more embedded software services, the context-sensitive attributes declaring whether an embedded software service is transactional and recovery behavior of the embedded software service upon a termination event, wherein the recovery behavior is at least one of compensate, rollback or commit;
   tracking in an invocation map, based on the execution graph, a context of the composite software service, the context including states of execution of the one or more embedded software services;
   associating a unique ID with the invocation of each of the one or more embedded software services for the purpose of recovery from an unknown state;
   invoking one of the one or more embedded software services;
   when receiving an indication that invocation of one of the one or more embedded software services was successful, updating a state of the successful embedded software service in the invocation map; and
   when receiving an indication that invocation of one of the one or more embedded software services was unsuccessful, using the unique ID associated with the unsuccessful embedded software service to re-invoke the unsuccessful embedded software service.

2. The method of claim 1, wherein the invocation map is further configured to store an object holding a context of a shared memory such that changes to the shared memory based on the context-sensitive attributes are reflected.

3. The method of claim 1, wherein when receiving an indication that invocation of one of the one or more embedded software services was successful comprises determining whether all of the one or more embedded software services of the composite software service are consumed successfully including a successful routing of any services that failed.

4. The method of claim 3, wherein when receiving an indication that invocation of all of the one or more embedded software services was successful further comprises:
   determining whether the composite software service is a root service such that it is contained within another composite software service;
   if the composite software service is a root service, committing together all of the one or more embedded software services; and
   if the composite software service is not a root service, waiting until the composite software service receives a commit or rollback call from a context of the another composite software service.

5. The method of claim 1, wherein when receiving an indication that invocation of one of the one or more embedded software services was unsuccessful comprises determining whether any of the one or more embedded software services of the composite software service are consumed unsuccessfully without having a predefined routing upon failure.

6. The method of claim 5, wherein when receiving an indication that invocation of one of the one or more embedded software services was unsuccessful, rolling back a context of an instance of the composite software service.

7. The method of claim 1, wherein the invocation map further stores modifications to shared data structures accessed in a definition of the composite software service as an object holding a context of a shared memory and updating the invocation map to reflect changes or discarding changes done to the shared memory based on a context of a composite software service instance.

8. The method of claim 1, wherein the one or more embedded software services is associated with a service library, wherein invoking one of the one or more embedded software services comprises using the unique ID associated with the invoked embedded software service to access a wrapper interface associated with the service library.

9. The method of claim 8, further comprising:
   obtaining a context of the service library;
   preparing a software service associated to the service library within the service library context; and
   performing a recovery behavior on the service library context upon a termination event.

* * * * *

UNITED STATES PATENT AND TRADEMARK OFFICE
CERTIFICATE OF CORRECTION

PATENT NO. : 7,584,454 B1  
APPLICATION NO. : 10/711322  
DATED : September 1, 2009  
INVENTOR(S) : Arash Massoudi Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1322 days.

Signed and Sealed this

Fourteenth Day of September, 2010

David J. Kappos  
*Director of the United States Patent and Trademark Office*